S. H. RAHHAL.
TROLLEY HARP.
APPLICATION FILED FEB. 13, 1918.

1,291,132.

Patented Jan. 14, 1919.

Witness
Karl N. Butler

Inventor
Solomon H. Rahhal
By
Attorneys

UNITED STATES PATENT OFFICE.

SOLOMON H. RAHHAL, OF DETROIT, MICHIGAN.

TROLLEY-HARP.

1,291,132.  Specification of Letters Patent.  Patented Jan. 14, 1919.

Application filed February 13, 1918. Serial No. 216,953.

*To all whom it may concern:*

Be it known that I, SOLOMON H. RAHHAL, a citizen of the United States of America, residing at Detroit, in the county of Wayne and State of Michigan, have invented certain new and useful Improvements in Trolley-Harps, of which the following is a specification, reference being had therein to the accompanying drawings.

This invention relates to trolley harps and the primary object of my invention is to provide a novel trolley harp which will normally retain a trolley wheel in engagement with the trolley wire or similar electrical conductor, particularly when the trolley wheel encounters curved or undulatory sections of the trolley wire and in this manner eliminate accidents caused by a car stopping on a railroad track or loss of control when descending grades.

Another object of my invention is to provide a wire retaining device for a trolley harp that will also retain a wheel journal pin in the harp without the use of the customary nuts and without any danger of the pin becoming accidentally displaced.

A further object of my invention is to provide a strong and durable trolley harp that may be easily substituted for the harps now in use and manipulated by a conductor or operator in the usual manner when shifting the harp to and from a trolley wire.

The above and other objects are attained by a mechanical construction that may be hereinafter described and then claimed, and reference will now be had to the drawing, wherein.

Figure 1:
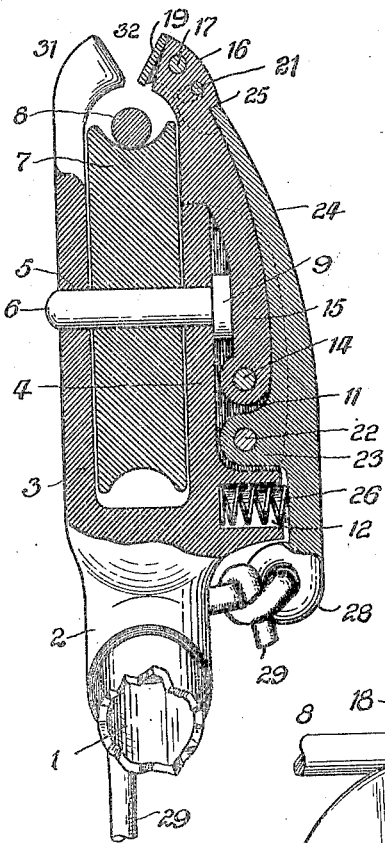
Figure 1 is a front elevation of the trolley harp, partly broken away and partly in section.
Figure 3:
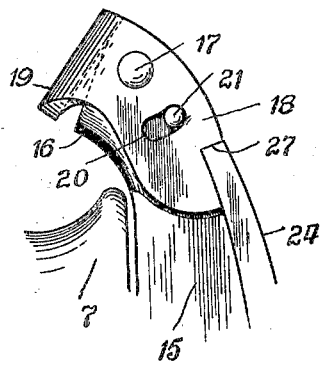
Fig. 3 is an enlarged front elevation of a portion of the harp.
Figure 2:
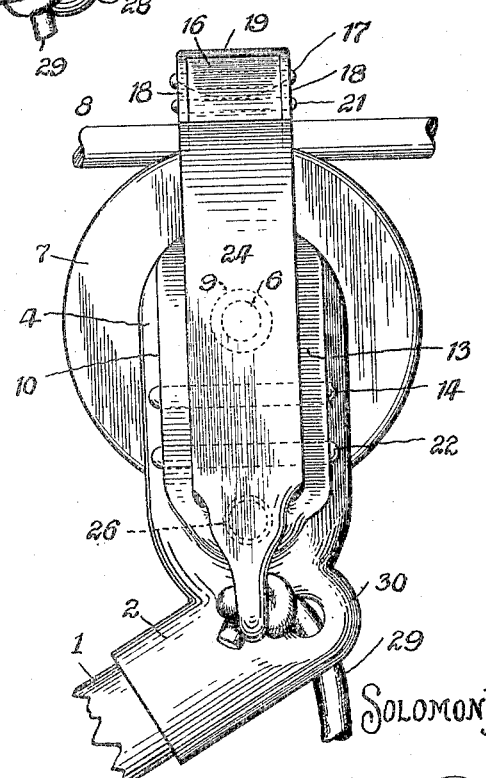
Fig. 2 is a side elevation of the trolley harp.

In the drawing, the reference numeral 1 denotes a portion of a trolley pole and mounted on the upper end thereof is a harp socket 2 having vertically disposed parallel harp arms 3 and 4 provided with apertures 5 for a journal pin 6, which supports a conventional form of rotatable trolley wheel 7 adapted to travel against a trolley wire 8 or other electric conductor. The journal pin 6 is devoid of screw threads, nuts or cotter pins, but has a head 9 engaging the outer side of the arm 4 and preventing displacement of said pin in one direction.

The harp arm 4 has the outer side thereof provided with an enlargement 10 and said enlargement is provided with open recesses 11 and 12, the former providing side flanges 13. Mounted in the flanges 13, transversely of the recess 11, is a pin 14 and pivoted on said pin is the lower end of a retaining member 15, which extends over the arm 4 and has a curved end or extremity 16 overhanging the upper edge of the trolley wheel 7. The retaining member 15 engages the head 9 of the journal pin 6 and prevents displacement of said journal pin, while the curved and overhanging extremity 16 is adapted to prevent displacement of the trolley wheel 7 relative to the wire 8.

Pivotally connected to the curved extremity 16 of the retaining member 15 by a pin 17 are the side ears 18 of a latch 19, said latch being somewhat U-shaped in plan and loosely fitted over the end of the extremity 16, with the side ears 18 in cut away side walls of the flanges 13. The side ears 18 are slotted, as at 20, to receive the ends of a stud or pin 21 carried by the extremity 16 of the retaining member 15, said pin or stud limiting the tilting movement of the latch 19 on the retaining member.

The flanges 13 are provided with another transverse pin 22 and pivoted on said pin within the recess 11 is an apertured lug 23 of a keeper member 24, said member extending upwardly and curved slightly to form the outer curved wall of the retaining member 15. The keeper member 24 has the upper end thereof engaging a shoulder 25 of the extremity 16, and a coiled expansion spring 26 is placed in a recess 12 of the side arm 4, so that the expansive force of said spring against the lower end of the keeper member 24 will retain the upper end thereof against the retaining member 15 and thus hold said retaining member in an active position, as shown in Fig. 1.

The side ears 18 of the latch 19 are notched or cut away as at 27, so as to engage the upper end of the keeper member 24 and tilt or shift said keeper member when the trolley wheel 7 is placed in engagement with the trolley wire.

The lower end of the keeper member 24 terminates in an eye 28 and suitably connected thereto is a trolley rope or cable 29 that extends through an eye portion 30 of the harp, and then downwardly convenient to the conductor or operator of a car.

The harp arm 3 has the upper end or extremity thereof curved inwardly as at 31, to overhang the trolley wheel 7, and this arm of the harp coöperates with the latch member 19 in providing a V-shaped entrance 32 to the top of the trolley wheel 7. The V-shaped entrance 32 has one fixed wall and the other yieldable, consequently it is possible for the harp to pass by wire hangers frogs, switches and such other overhead structures associated with a trolley wire. The V-shaped entrance also facilitates placing the wheel 7 in engagement with the wire 8, as the latch member 19 may recede, release the keeper member 24 relative to the retaining member 15, and then cause said retaining member to shift outwardly and increase the gap between the upper end of the arm 4 and the upper end of the retaining member 15.

To remove the wheel 7 from the wire 8, the rope or cable 29 is pulled upon, thereby releasing the keeper member 24 relative to the retaining member and permits said retaining member to spring outwardly when contacting with the wire 8. With the rope or cable 29 passing through the eye portion 30 the trolley pole 1 can be easily manipulated.

One embodiment of my invention has been illustrated, but it is to be understood that the structural elements are susceptible to such variations as fall within the scope of the appended claims.

What I claim is:—

1. A trolley harp comprising arms with one of said arms shaped to overhang a trolley wire, a retaining member carried by the other arm of said harp, a pivoted latch carried by the upper end of said retaining member and adapted to overhang the trolley wire and coöperate with the first mentioned arm in providing a V-shaped entrance to the top of said harp, and means carried by said harp engaging the outer side of said retaining member adapted to hold said member in a closed position.

2. A trolley harp comprising arms with one of said arms shaped to overhang a wheel journaled in said arm, a pivoted retaining member carried by the other arm of said harp and having the upper end thereof shaped to overhang the wheel in said harp, a latch at the upper end of said retaining member having side ears and a spring pressed pivoted keeper member carried by said harp normally engaging the outer side of said retaining member and adapted to be shifted relative thereto by the side ears of said latch.

In testimony whereof I affix my signature in the presence of two witnesses.

SOLOMON H. RAHHAL.

Witnesses:
 LEWIS E. FLANDERS,
 ANNA M. DORR.

Copies of this patent may be obtained for five cents each, by addressing the "Commissioner of Patents, Washington, D. C."